United States Patent Office 3,177,714
Patented Apr. 13, 1965

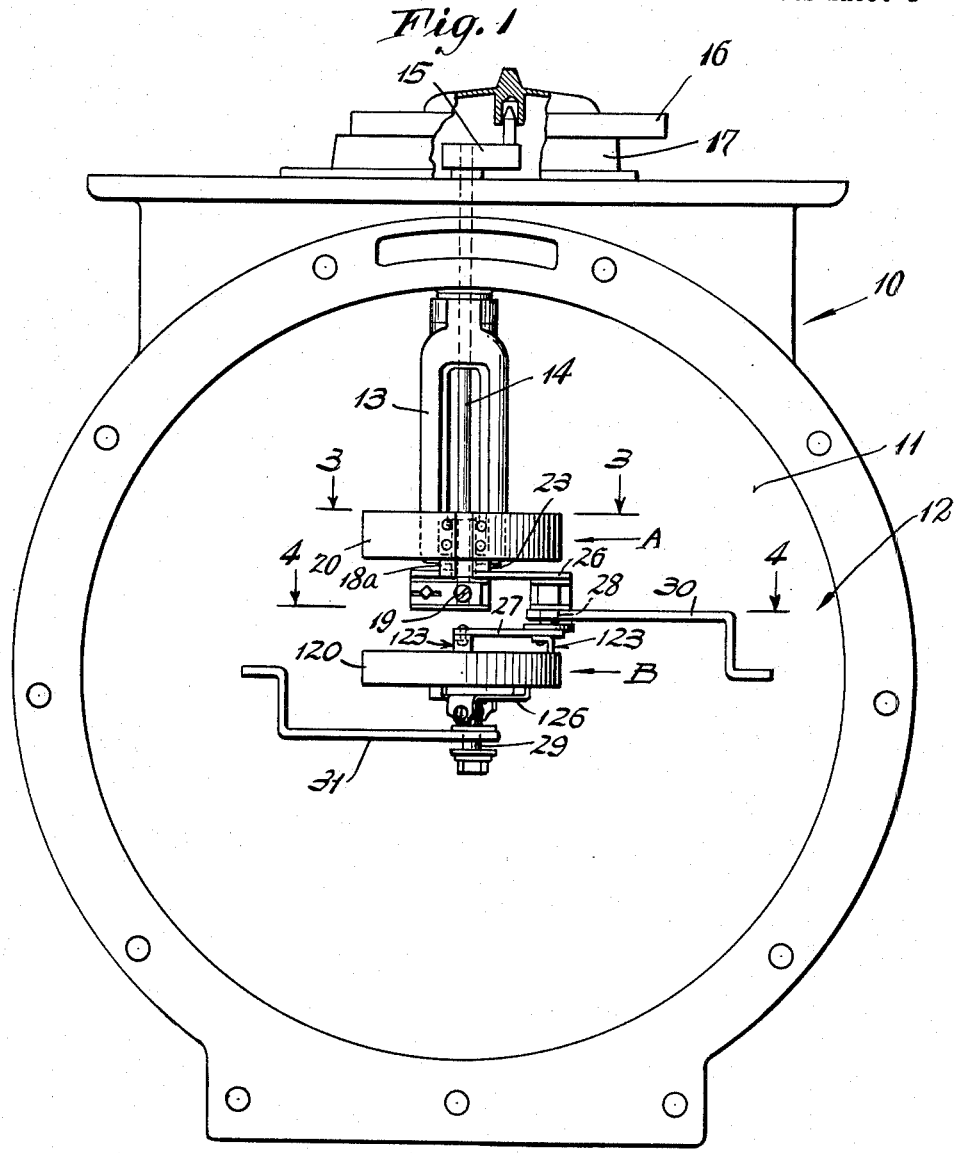

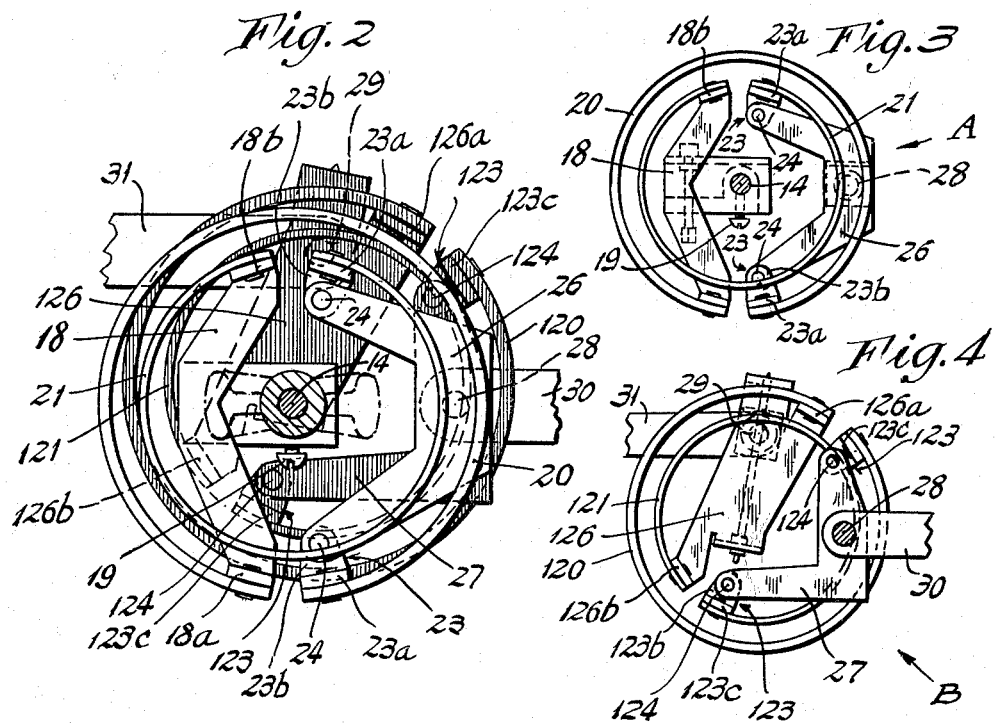
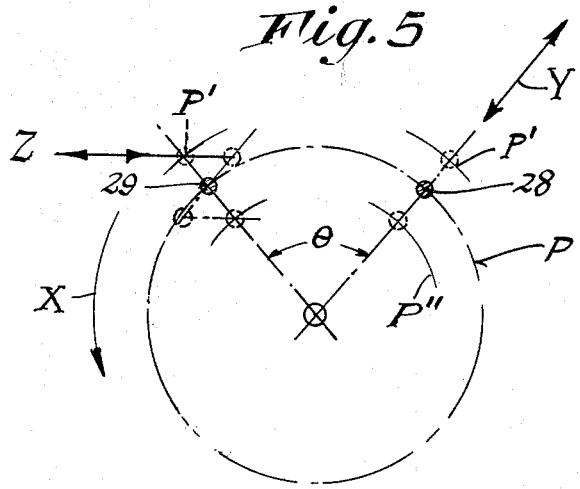

3,177,714
TEMPERATURE COMPENSATED METER
William Mayeran, Bridgeport, Conn., assignor to Textron Inc., Providence, R.I., a corporation of Rhode Island
Filed Mar. 22, 1963, Ser. No. 267,218
4 Claims. (Cl. 73—281)

This invention relates to temperature compensating means for a gas meter and more particularly for a three chamber gas meter.

Temperature compensation in gas meters is desired since the heating value of a gas is proportional to its density which is proportional to its absolute temperature. Thus the quantity of gas passed with respect to the index reading should be diminished at low temperatures and increased at elevated temperatures.

The problem of temperature compensation in three chamber gas meters is complicated due to the fact that the tangent links are not connected to a single tangent post or stud but are connected to separated posts. This arrangement complicates the modulation of the diaphragm stroke to compensate for temperature change since any mid-angle unidirectional movement of the posts changes the relative angle between them and their pivot point which affects the relationship between the valves and diaphragms and results in timing errors.

It is an object of the present invention to provide a simple compensating means in which each tangent post is individually adjusted toward and away from the axis of the main shaft and to lie on a radius passing through the shaft with said posts being displaced by the tangent angle of the meter.

This is accomplished by employing two units, one for adjusting each of the posts, and coordinating the units so that the movement produced by thermal responsive means in each unit adjusts the posts to individually position them in proper angular relation with respect to one another and also locate them so that they move in a circular path around the main shaft to drive the same in accordance with the operation of the diaphragms of the meter.

A feature of the invention resides in the accurate compensation of the meter for temperature variations without affecting the timing of the meter.

Other features and advantages of the invention will be apparent from the specification and claims when considered in connection with the accompanying drawings in which:

FIGURE 1 is a view of a three chamber gas meter with one cover and diaphragm removed to expose the center chamber.

FIG. 2 is a top view of the temperature compensating means.

FIG. 3 is a view taken along line 3—3 of FIG. 1 showing the relation of the bimetallic members in the upper unit.

FIG. 4 is a view taken along line 4—4 of FIG. 1 showing the relation of the bimetallic members in the lower unit.

FIG. 5 is a diagrammatic view showing the adjustments of the two posts in accordance with the changes in temperature.

As shown in the drawings, the present invention is applied to a standard three chamber gas meter having a central portion 10 to which the usual end caps (not shown) are secured, which end caps secure diaphragms 11 in position to extend across the opening in the central portion to form the three chambers including a central chamber 12 in the meter. The central chamber has a bracket 13 mounting a main shaft 14 which has its upper end connected to a valve actuator 15 for moving the valve cover 16 in conjunction with the valve seat 17. The other end of the main shaft has secured thereto a mounting bracket 18 for mounting the temperature compensating means.

The temperature compensating means comprises an upper unit A and a lower unit B arranged in parallel relation, as shown in FIG. 1, and each having thermal responsive means therein. The upper unit is mounted on the mounting bracket 18 which extends transversely of the axis of the main shaft and is secured thereto by a screw 19. The bracket has upstanding end parts 18a, 18b to which are secured one end of the opposed bimetallic members 20, 21 as shown in FIGS. 2 and 3. The bimetallic members 20, 21 extend in a substantially circular path in excess of 270° and are illustrated as extending approximately 340°. They are nested and are preferably arranged substantially coaxial with the axis of the main shaft with their free ends located in a plane which would be parallel to a plane passing through the axis of the shaft 14 and disposed on opposite sides of a line perpendicular to said plane at the axis of the shaft. The use of two bimetallic members so arranged produces greater rigidity and balanced linear movement. As shown in FIGS. 2 and 3, each of the free ends is connected to a leg 23a of an L-shaped bracket 23. The L-shaped brackets 23 are each connected by a pivot 24 disposed in the base 23b of the bracket and carried by the ends of a lower bracket 26 so as to move the lower bracket in accordance with the movement of the free ends in response to variations in temperature.

The lower unit B is secured to the lower bracket for movement therewith by a tangent link post 28 rigidly connecting a top bracket 27 of the lower unit B thereto. As shown in FIGS. 2 and 4, the temperature responsive means in the lower unit comprises a pair of opposed bimetallic members 120, 121 which are nested and are similar in extent to the members 20, 21. One end of each bimetallic element is secured to the leg 123a of an L-shaped bracket 123 which bracket is mounted by pivot 124 on the top bracket 27 passing through a base 123b of the L-shaped bracket 123. The other ends of the bimetallic members are secured to the upstanding end parts 126a and 126b of the bottom bracket or tangent adjustment flange 126 so as to move the flange relative to the upper unit in response to variations in temperature. The bottom bracket has a tangent link post 29 secured thereto. The tangent link posts are connected to the diaphragm driven links 30, 31 so as to move the posts in a circular path as shown in the dot and dash line P in FIG. 5 to rotate the main shaft in the direction of the arrow X. Further, the posts are located so that they are operatively displaced by a tangent angle θ.

The bimetallic members in each unit are selected and their thickness, activity and curvature coordinated so that the free ends thereof will move the tangent post and other elements connected thereto in an accurate straight-line movement in the proper direction to locate the two posts on their respective radius for movement in the same circular path.

The unit A is so arranged that the bimetallic members 20, 21 will move the post 28 along the line Y which is located on a radius passing through the axis. Since the unit B moves with post 28, it will carry the post 29 in a path parallel to the line Y. The unit B is angularly displaced from the unit A so that the bimetallic members 120, 121 move the post 29 on the unit in the direction Z which is transverse to the direction of movement of the post 28 and will locate the post 29 on a radius displaced from the path of movement of the post 28 by the tangent angle θ.

This individual control of the posts 28, 29 under changes in temperature can be best understood from a consideration of FIG. 5. In this figure, P represents the normal path of rotation of the posts 28, 29 which are displaced by the tangent angle θ. When there is a temperature increase, unit A will move the post 28 outwardly, as shown by the dot and dash lines, to a path P'. This will also cause the post 29 to move in the same direction. The temperature rise will cause unit B to move the post 29 to the left to the point on the radius passing through the axis at a point on path P'. Similarly, when there is a drop in temperature, unit A will move the post 28 inwardly along the radius to the path P''. This will also move the post 29 in a parallel path. Unit B will move the post 29 to the right and locate it on the path P'' and on the radius therefor.

It will be seen that the present invention by the joint action of the units A and B will adjust the displacement of the diaphragms, without affecting the timing of the meter, to compensate for expansion or contraction of the gas to insure a uniform heat value of the gas which is proportional to the density of the gas.

Variations and modifications may be made within the scope of the claims and portions of the improvements may be used without others.

I claim:

1. Temperature compensating means for a three chamber gas meter for modulating the diaphragm strokes to compensate for temperature changes with said meter having a center chamber and means rotatably mounting a main shaft in said center chamber to be driven by diaphragm-operated tangent links operatively displaced by a predetermined tangent angle, said compensating means comprising an upper unit having thermal responsive means and a lower unit having thermal responsive means, said upper unit being connected to said shaft, a first tangent link post connecting the lower unit to the upper unit to be moved thereby along a radius passing through the axis of the main shaft in response to temperature variations and a second tangent link post connected to the lower unit to be moved thereby in response to temperature variations in a direction transverse to a second radius passing through the axis of the main shaft and displaced from said first-named radius by said tangent angle and intersecting said second radius at a distance equal to the distance of the first tangent link post from the center of the shaft.

2. Temperature compensating means for a three chamber gas meter for modulating the diaphragm strokes to compensate for temperature changes with said meter having a center chamber and means rotatably mounting a main shaft in said center chamber to be driven by diaphragm-operated tangent links operatively displaced by a predetermined tangent angle, said compensating means comprising an upper unit having bimetallic thermal responsive members and a lower unit having bimetallic thermal responsive members, said units being disposed in parallel planes and said upper unit being connected to said shaft, a first tangent link post connecting the lower unit to the upper unit to be moved by said bimetallic members thereof along a radius passing through the axis of the main shaft in response to temperature variations and a second tangent link stud connected to the lower unit to be moved by said bimetallic members thereof in response to temperature variations in a direction transverse to a second radius passing through the axis of the main shaft and displaced from said first-named radius by said tangent angle and intersecting said second radius at a distance equal to the distance of the first tangent link post from the center of the shaft.

3. Temperature compensating means for a three chamber gas meter for modulating the diaphragm strokes thereof to compensate for temperature changes with said meter having a center chamber and means rotatably mounting a main shaft therein, comprising a mounting bracket secured to the main shaft, an upper unit comprising a pair of oppositely extending bimetallic members extending around the axis of said main shaft, each having one end fixed to said bracket with the other ends free to move in response to temperature variations, said bimetallic members having the elements thereof arranged so that the free ends are movable in the same direction toward or away from the plane of the main shaft in response to variation in temperature, a lower bracket disposed below the mounting bracket and having means adjacent the ends thereof connected to the free ends of the bimetallic members to be moved thereby, a lower unit having a top bracket connected by a first tangent link post to said lower bracket for movement therewith, said lower unit comprising a pair of oppositely extending bimetallic members each having one end secured to an end of the top bracket, a tangent adjustment flange connected to the free ends of the bimetallic members of the lower unit for movement thereby and having a tangent link post mounted thereon to be moved thereby, said tangent posts having a predetermined tangent angle therebetween and moving in predetermined circular paths about the main shaft, said upper unit moving the first tangent post and lower unit in a straight-line radial movement toward and away from the axis of the main shaft and said lower unit moving the second tangent post in response to temperature variations in a direction transverse to a second radius passing through the axis of the main shaft and displaced from said first-named radius by said tangent angle and intersecting said second radius at a distance equal to the distance of the first tangent link post from the center of the shaft.

4. Temperature compensating means for a three chamber gas meter for modulating the diaphragm strokes thereof to compensate for temperature changes, said meter having a center chamber and means rotatably mounting a main shaft therein, comprising a mounting bracket secured to the main shaft, an upper unit comprising a pair bimetallic members extending for approximately 340° around the axis of said main shaft, each having one end fixed to said mounting bracket with the other ends free to move in response to temperature variations, said bimetallic members having the elements thereof arranged so that the free ends are movable in the same direction toward or away from the plane of the main shaft in response to variation in temperature, a lower bracket disposed below the mounting bracket and having means adjacent the ends thereof connected to the free ends of the bimetallic members to be moved thereby, a lower unit having a top bracket connected by a first tangent post to said lower bracket, said lower unit comprising a pair of oppositely disposed, substantially circular, nested bimetallic members each extending for approximately 340° and having one end secured to an end of the top bracket, a tangent adjustment flange connected to the free ends of the bimetallic members of the lower unit for movement thereby and having a tangent post mounted thereon to be moved thereby, said tangent posts being displaced by a predetermined tangent angle and moving in a circular path about the main shaft, said upper unit moving the first tangent post and lower unit in a straight-line, radial movement toward and away from the axis of the main shaft and said lower unit moving the second tangent post in response to temperature variations in a direction transverse to a second radius passing through the axis of the main shaft and displaced from said first-named radius by said tangent angle and intersecting said second radius at a distance equal to the distance of the first tangent link post from the center of the shaft.

No references cited.